United States Patent
Kurabayashi (10) Patent No.: US 10,990,591 B2
(45) Date of Patent: Apr. 27, 2021

(54) SUB-QUERY PROCESSING SYSTEM, METHOD, AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 228 days.

(21) Appl. No.: 16/215,163

(22) Filed: Dec. 10, 2018

(65) Prior Publication Data

US 2019/0171643 A1 Jun. 6, 2019

Related U.S. Application Data

(63) Continuation of application No. PCT/JP2017/008806, filed on Mar. 6, 2017.

(30) Foreign Application Priority Data

Jun. 9, 2016 (JP) .............................. JP2016-115415

(51) Int. Cl.
*G06F 16/2453* (2019.01)
*G06F 16/2455* (2019.01)
*G06F 16/00* (2019.01)

(52) U.S. Cl.
CPC ........ *G06F 16/24535* (2019.01); *G06F 16/00* (2019.01); *G06F 16/2455* (2019.01)

(58) Field of Classification Search
CPC .............. G06F 16/24535; G06F 16/00; G06F 16/2455; G06F 16/9032; G06F 16/90335;

(Continued)

(56) References Cited

U.S. PATENT DOCUMENTS 5,367,675 A * 11/1994 Cheng ............... G06F 16/24544
10,031,948 B1 * 7/2018 Kulshreshtha .......... G06F 9/466

(Continued)

FOREIGN PATENT DOCUMENTS

JP H02-130673 A 5/1990
JP H03-052068 A 3/1991

(Continued)

OTHER PUBLICATIONS

International Search Report issued in Application No. PCT/JP2017/008806, dated Mar. 28, 2017 (2 pages).

(Continued)

*Primary Examiner* — Jesse P Frumkin (57) ABSTRACT

An information processing method executed by an information processing system that executes processing for searching data to be searched by using a query condition that can be entered via a predetermined user interface and in which individual conditions constituting a query satisfy three properties consisting of reductiveness, idempotence, and commutativity, includes a pre-processing executing step of executing processing prior to processing for searching, and a search processing step of executing processing for searching. The pre-processing executing step includes a query extracting step of extracting a plurality of limited kinds of sub-queries constituting minimum units of queries and satisfying the three properties consisting of the reductiveness, the idempotence, and the commutativity by analyzing a set of statically defined kinds of queries, and a query executing step of executing each of the plurality of kinds of sub-queries extracted in the query extracting step.

7 Claims, 9 Drawing Sheets

(58) Field of Classification Search
CPC ... G06F 16/2425; G06F 16/9017; A63F 13/30
See application file for complete search history.

(56) References Cited

U.S. PATENT DOCUMENTS

| | | |
|---|---|---|
| 2002/0059281 A1 | 5/2002 | Watanabe et al. |
| 2005/0240570 A1 | 10/2005 | Ozbutun |
| 2005/0289548 A1* | 12/2005 | Farchi ................... G06F 9/466 718/101 |
| 2006/0101011 A1* | 5/2006 | Lindsay ............ G06F 16/24537 |
| 2007/0078816 A1* | 4/2007 | Stern ................... G06F 16/9027 |
| 2009/0276473 A1 | 11/2009 | Fukuda et al. |
| 2015/0234888 A1* | 8/2015 | Ahmed ............. G06F 16/24535 707/765 |
| 2017/0228430 A1* | 8/2017 | Li ..................... G06F 16/24524 |
| 2018/0131678 A1* | 5/2018 | Agarwal ................... G06F 9/54 |

FOREIGN PATENT DOCUMENTS

| | | |
|---|---|---|
| JP | H03-230273 A | 10/1991 |
| JP | H11-212980 A | 8/1999 |
| JP | 2003-108561 A | 4/2003 |
| JP | 2007-534087 A | 11/2007 |
| JP | 2009-266147 A | 11/2009 |

OTHER PUBLICATIONS

Notification of Reasons for Refusal issued in corresponding Japanese Application No. 2016-115415, dated Sep. 13, 2016 (3 pages).

\* cited by examiner

JOINED AS OR CONDITIONS

JOINED AS AND CONDITIONS

| Card list | Deck builder | | Log in | Register for membership |

Card name [○○○]

Class
Elf  Royal  Witch  Dragon  ---------- (Clear)

Costs [○○]  (Clear)

Card type  ☑ Unit    ☑ Spell    ☐ Field    (Clear)

Rarity  ☐ Bronze rare  ☐ Silver rare  ☑ Gold rare  ☐ Legend  (Clear)

[Detailed search ▼]

Attacking power [2 ▼] [equals ▼]    Physical power [15 ▼] [less than or equal to ▼]

Type [Soil ceremony ▼]    Keyword [Berserk ▼]

Include tokens ☐ ON    Card text search [Having special ability]

(Search)  (Reset)    (Visual)  (Details)

FIG. 8

| ID | CLASS | RARITY | ATTACKING POWER |
|---|---|---|---|
| 0001 | ROYAL | LEGEND | 10 |
| 0002 | WITCH | LEGEND | 7 |
| 0003 | BISHOP | GOLD RARE | 2 |
| 0004 | ROYAL | SILVER RARE | 7 |
| ⋮ | ⋮ | ⋮ | ⋮ |
| u | VAMPIRE | LEGEND | 15 |

Original: [ { attribute: 'char_type', condition: [ '1' ] },
  { attribute: 'clan', condition: [ '2' ] },
  { attribute: 'tribe', condition: [] },
  { attribute: 'cost', condition: [] },
  { attribute: 'rarity', condition: [ '1', '2' ] },
  { attribute: 'life', condition: [] },
  { attribute: 'atk',
    condition: [ '4', '5', '6', '7', '8', '9', '10', '11', '12', '13', '14', '15' ] },
  { attribute: 'fulltext', lang: 'Jpn', condition: '' } ]

Optimized: [ { attribute: 'clan', condition: [ '2' ], cost: 120 },
  { attribute: 'atk',
    condition: [ '4', '5', '6', '7', '8', '9', '10', '11', '12', '13', '14', '15' ],
    cost: 230 },
  { attribute: 'char_type', condition: [ '1' ], cost: 612 },
  { attribute: 'rarity', condition: [ '1', '2' ], cost: 670 } ]

SUB-QUERY PROCESSING SYSTEM, METHOD, AND PROGRAM

BACKGROUND

Technical Field

The present invention relates to information processing systems and methods and programs.

Related Art

An existing technology for enhancing the speed of a database is indexing technology (e.g., see Patent Literature 1).

However, indexing technology is directed to enhancing the speed of query execution in the case where searching is performed with search conditions that are not specified in advance.

The technology is not optimized for the type of data structure with which the kinds of operations that may trigger data searching are finite, i.e., the type of data structure involving only finite queries.

Meanwhile, technology for caching query results for a database is an example of a technology for enhancing the speed of database searching by using the status of queries.

For example, algorithms such as Least Recently Used (LRU), with which the search result that is least recently used is discarded first, Most Recently Used (MRU), with which the search result that is most recently used is discarded first, and Least Frequently Used (LFU), with which the search result that is least frequently used recently is discarded first, are well known (e.g., see Patent Literature 2).

With these algorithms, however, a cache is managed depending on the frequencies of usage of queries. Thus, these algorithms do not work effectively in applications in which there is no locality of searching, for example, as in the case of online games.

CITATION LIST

Patent Literature

Japanese Unexamined Patent Application, Publication No. Hei 11-212980

Japanese Unexamined Patent Application, Publication No. 2009-266147

SUMMARY

One or more embodiments of the present invention addresses enhancing the speed of processing for searching or referring to a fixed data set storing parameters, scenario proceedings, etc. of an online game.

A game system searches static data for necessary pieces at an extremely high frequency as battles or a game scenario proceeds. This search processing is an operation that is executed constantly while a game is being executed and thus considerably affects the responsiveness of the game as a whole.

In particular, in the type of game that operates on a Web browser, with which it is difficult to install data in advance on the client side, searching of CSV files constitutes a performance bottleneck. Therefore, a critical issue is enhancing the speed of searching static data.

However, in an online game that is provided on a long-term basis, the amount of data used in the game, such as the attributes of items and cards, becomes huge, and it is not rare that static data exceeding 100 megabytes just with characters and numerical values exists in a game in some cases.

Furthermore, when a game is deployed in multiple languages, including an English version, or in foreign markets, natural language data increases with the number of languages supported or the number of markets entered.

One or more embodiments of the present invention enhances the efficiency and speed of processing for searching or referring to static data, such as parameters or scenario proceedings of an online game, thereby attaining extremely high responsiveness on a smartphone, which can only have no more than a limited computing ability, and on a server that accepts such a huge number of requests that there is not much remaining capacity in the processing ability thereof.

An information processing system according to an aspect of the present invention is:

an information processing system that executes processing for searching data to be searched by using a query condition that can be entered via a predetermined user interface and in which individual conditions constituting a query satisfy three properties consisting of reductiveness, idempotence, and commutativity, the information processing system comprising:

a pre-processing executing means for executing processing prior to processing for searching; and a search processing means for executing processing for searching, wherein the pre-processing executing means includes:

a query extracting means for extracting a plurality of kinds of sub-queries from a set of query conditions that may be used with the data to be searched;

a query executing means for executing each of the plurality of kinds of sub-queries extracted by the query extracting means;

an associating means for generating, as association data for each of the plurality of kinds of sub-queries extracted by the query extracting means, data in which a result of execution by the query executing means is associated with information that allows identification of the kind of sub-query associated with the result of execution; and a management means for managing the association data for each of the plurality of kinds of sub-queries, generated by the associating means, and wherein the search processing means includes:

an accepting means for accepting, as a searching query condition, a query condition entered for searching via the user interface;

a dividing means for dividing the searching query condition accepted by the accepting means into a set of one or more kinds of sub-queries;

an execution-result extracting means for extracting, from the association data, the result of execution of each of the one or more kinds of sub-queries resulting from the division by the dividing means and belonging to the set on the basis of the information that allows identification of each of the one or more kinds of sub-queries; and a search-result generating means for generating, on the basis of the result of extraction by the execution-result extracting means, a search result for the searching query condition accepted by the accepting means.

According to the one or more embodiments of the present invention, by enhancing the efficiency and speed of processing for searching or referring to static data, such as parameters or scenario proceedings of an online game, it is possible to attain extremely high responsiveness on a smartphone, which can only have no more than a limited computing ability, and on a server that accepts such a huge number of requests that there is not much remaining capacity in the processing ability thereof.

DETAILED DESCRIPTION

Embodiments of the present invention will be described below with reference to the drawings.

Figure 1:
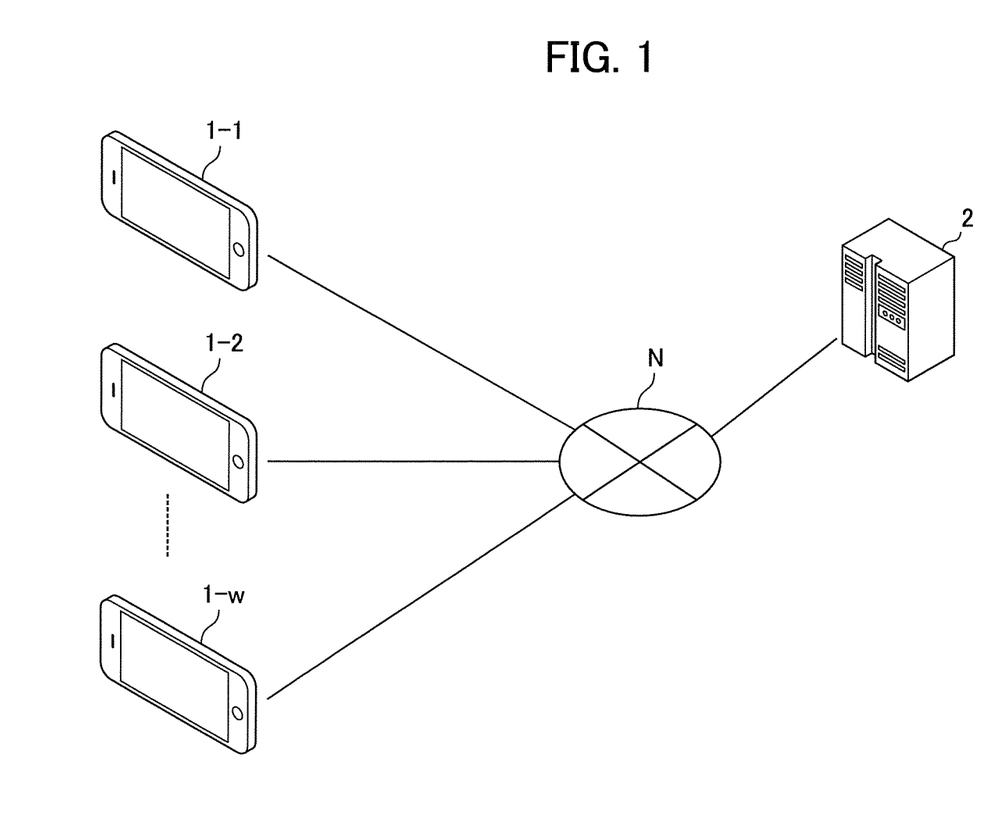
FIG. 1 is a diagram showing the configuration of an information system according to an embodiment of the present invention.

FIG. 1 shows the configuration of an information processing system according to an embodiment of the present invention.

The information processing system shown in FIG. 1 is a system including player terminals 1-1 to 1-w individually used by w players (w is an arbitrary integer greater than or equal to 1) and also including a server 2. The individual player terminals 1-1 to 1-w and the server 2 are connected to each other via a predetermined network N, such as the Internet.

The server 2 provides an environment that allows efficient and high-speed searching, etc. of static data used in a game or the like executed on the individual player terminals 1-1 to 1-w. Accordingly, extremely high responsiveness is attained in the game or the like.

Hereinafter, in the case where there is no need for distinction among the individual player terminals 1-1 to 1-w, these will be referred to collectively as "player terminals 1".

Figure 2:
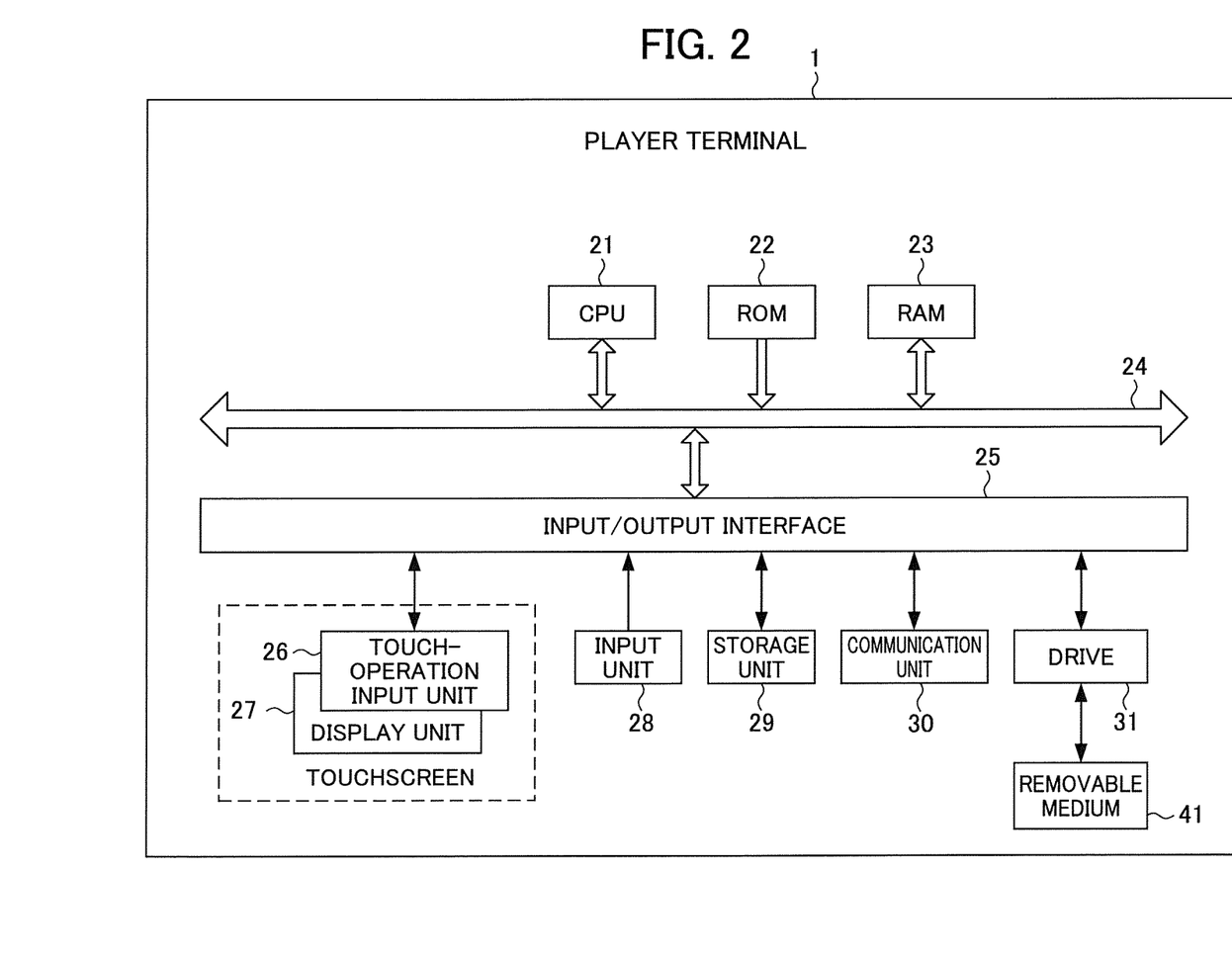
FIG. 2 is a block diagram showing, in the information processing system in FIG. 1, the hardware configuration of a player terminal according to an embodiment of the present invention.

FIG. 2 is a block diagram showing, in the information processing system in FIG. 1, the hardware configuration of a player terminal 1 according to an embodiment of the present invention.

The player terminal 1 is implemented by a smartphone or the like.

The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed.

The touch operation here refers to bringing something into contact with or in proximity to the touch-operation input unit 26. What is brought into contact with or in proximity to the touch-operation input unit 26 is, for example, a player's finger or a stylus.

The display unit 27 is implemented by a display, such as a liquid crystal display, and displays various kinds of images, such as images related to the game.

As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the player.

The storage unit 29 is implemented by a DRAM (Dynamic Random Access Memory) or the like and stores various kinds of data.

The communication unit 30 controls communications carried out with other devices (the server 2 and the other player terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
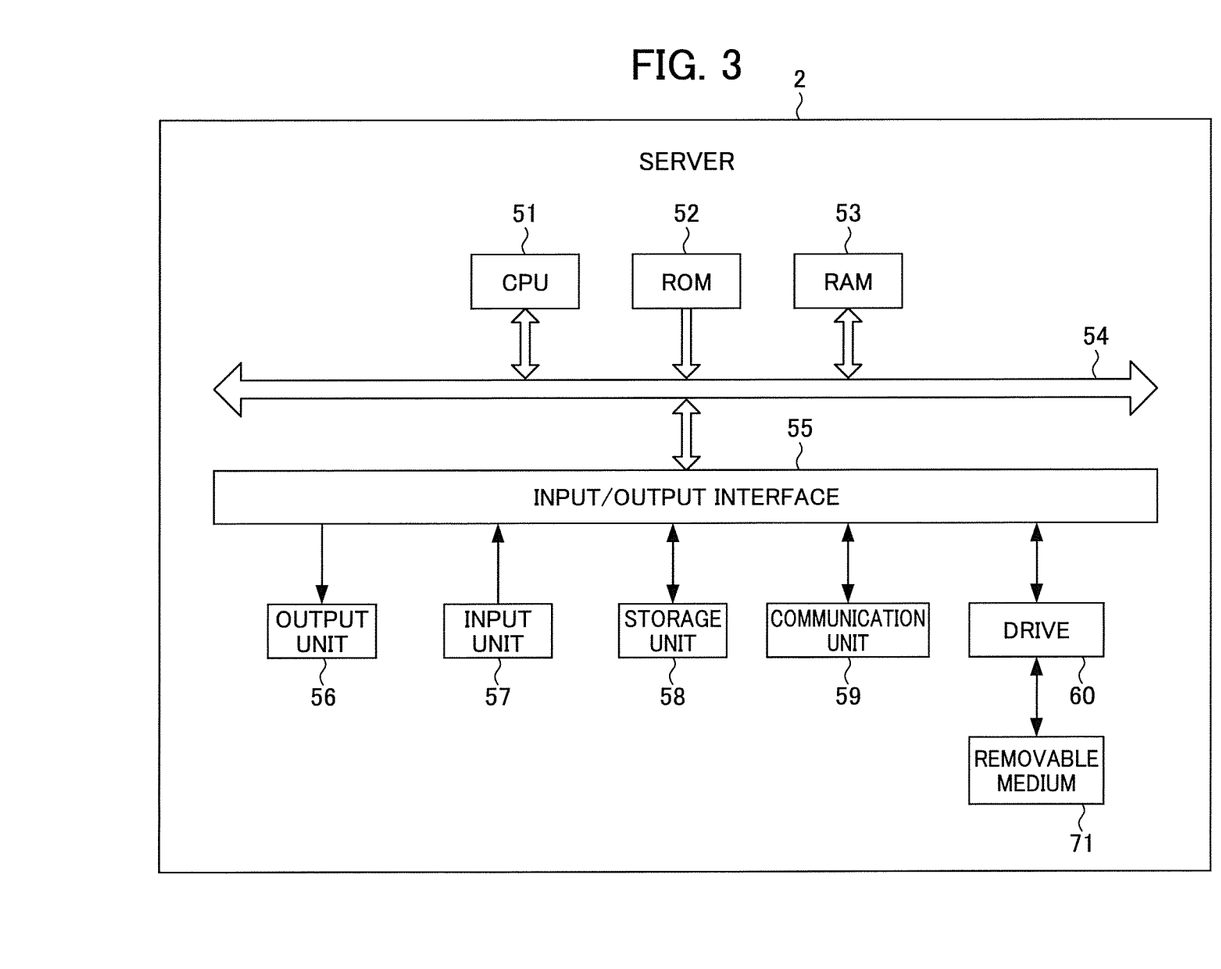
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60.

Since the configuration of the server 2 is basically the same as that of the player terminal 1 with the touchscreen thereof removed, a description thereof will be omitted here.

Through cooperation between the various kinds of hardware and various kinds of software in the player terminal 1 in FIG. 2 and the server 2 in FIG. 3, it becomes possible to execute high-speed processing for searching, etc. of static data at the player terminal 1 and the server 2.

Specifically, the information processing system according to this embodiment can execute a series of processing steps constituted of a "development (data introduction)" phase in which a database for high-speed searching is generated and an "execution (game play, etc.)" phase in which searching is actually performed during game play, etc.

More specifically, in this embodiment, the information processing system executes the following processing as a series of processing steps (hereinafter referred to as "data introduction processing") in the "development (data introduction)" phase in this embodiment.

The server 2 extracts a plurality of kinds of minimum units of queries (hereinafter referred to as "sub-queries") by analyzing in advance the set of queries that may be executed in the game.

The server 2 executes the plurality of kinds of extracted sub-queries individually and generates, as association data, data in which the individual results of the execution thereof are associated with information that allows identification of the associated kinds of sub-queries.

The server 2 stores and manages the association data for each of the plurality of kinds of sub-queries in a predetermined database (hereinafter referred to as "PL-data DB").

In the state where the association data for each of the plurality of kinds of sub-queries has been stored in the PL-data DB, the information processing system executes the following processing as data search processing (hereinafter referred to as "search processing") in the "execution (game play, etc.)" phase in this embodiment.

When the player enters a query condition via a predetermined user interface by operating the player terminal 1, the player terminal 1 sends the query condition to the server 2.

Upon receiving the searching query condition that has been sent, the server 2 divides the searching query condition into a set of one or more kinds of sub-queries and extracts the individual results of execution of the one or more kinds of sub-queries from the association data on the basis of the information that allows individual identification of the one or more kinds of sub-queries. Then, on the basis of the results of extraction, the server 2 generates a search result and presents the player terminal 1 with the search result.

Hereinafter, an example of the functional configuration of and a flow of processing executed by the information processing system that is capable of executing the data introduction processing and searching processing described above will be described.

Figure 4:
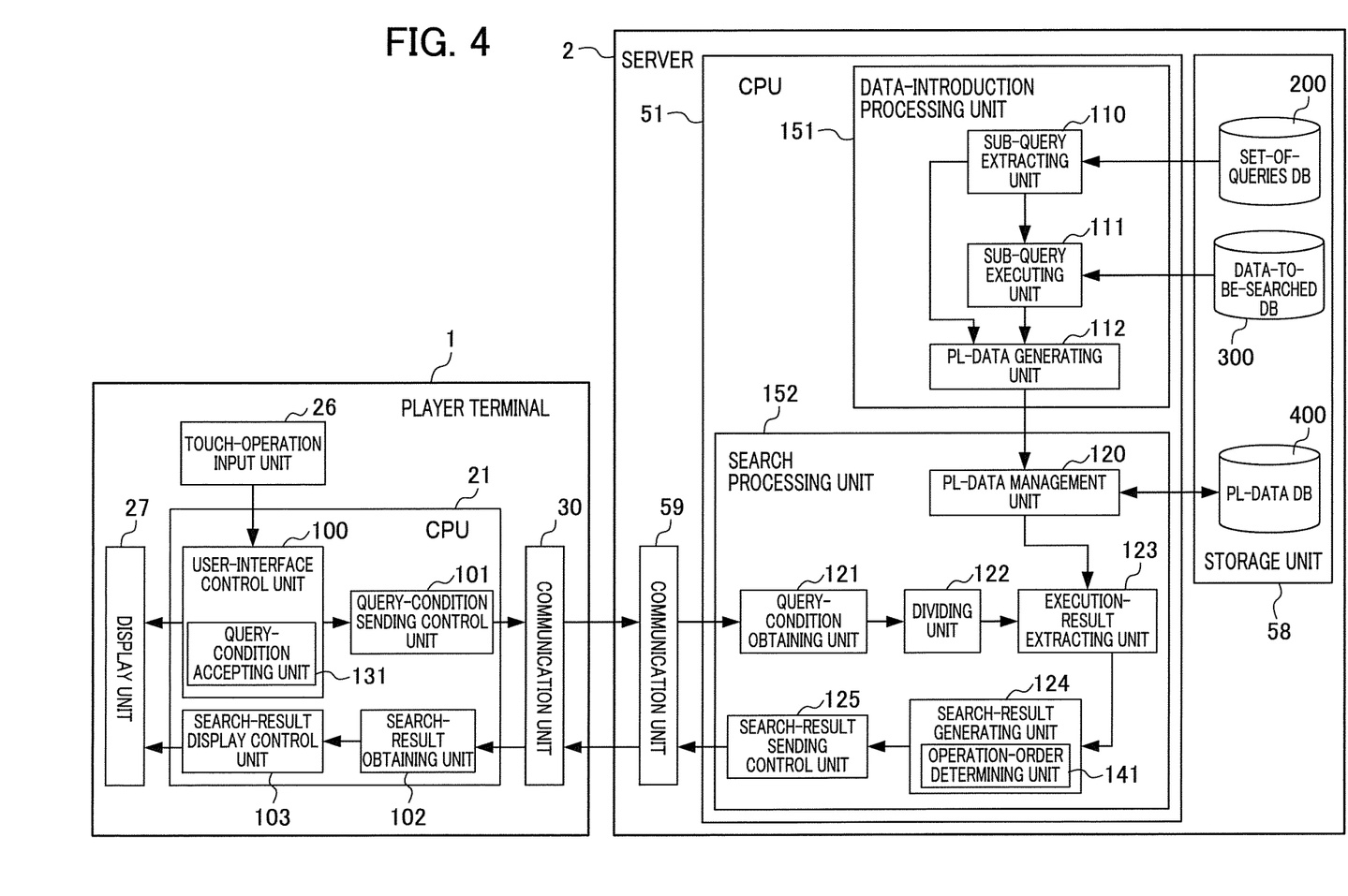
FIG. 4 is a functional block diagram showing an example of the functional configurations of the player terminal in FIG. 2 and the server in FIG. 3.

FIG. 4 is a functional block diagram showing, of the functional configurations of the player terminal 1 and the server 2, the functional configurations at the time of the execution of the data introduction processing and the search processing.

The CPU 21 of the player terminal 1 in FIG. 4 functions as a user-interface control unit 100, a query-condition sending control unit 101, a search-result obtaining unit 102, and a search-result display control unit 103.

The CPU 51 of the server 2 functions as a data-introduction processing unit 151 at the time of execution of the data introduction processing and functions as a search processing unit 152 at the time of the search processing.

In an area of the storage unit 58 of the server 2, a set-of-queries DB 200, a data-to-be-searched DB 300, and a PL-data DB 400 are provided.

First, the functional configurations in the data introduction processing will be described.

In the data introduction processing, the player terminal 1 does not particularly function, and only the data-introduction processing unit 151 functions in the server 2.

The data-introduction processing unit 151 includes a sub-query extracting unit 110, a sub-query executing unit 111, and a PL-data generating unit 112.

First, it is presupposed for the data introduction processing that a set of queries are stored in the set-of-queries DB 200.

The set of queries are a set of query conditions that may be used in the game in which data is to be introduced.

Specifically, the set of query conditions is defined by the following expression:

$$qH=\{a,b,c,d,e,\ldots,h\} \quad (1)$$

Here, qH signifies the set of query conditions associated with the H-th condition. For example, search conditions such as those based on the attacking power are associated with the relevant attribute. The elements a, b, c, d, e, ..., h of the set are values that are used as search conditions. For example, in the case of search conditions based on the attacking power with a maximum value of 15, the set of elements is $\{1, 2, 3, 4, 5, 6, 7, 8, 9, 10, 11, 12, 13, 14, 15\}$.

The sub-query extracting unit 110 of the CPU 51 of the server 2 analyzes the set of queries that may be executed in the game on the basis of the set of queries stored in the set-of-queries DB 200 and extracts a plurality of kinds of sub-queries on the basis of the results of analysis.

Here, it is presupposed for the data introduction processing that data to be searched in the game in which data is to be introduced is stored in the data-to-be-searched DB 300.

The data to be searched in this embodiment is all kinds of data that may be searched in the game, and the format thereof is not limited to any specific format. A wide variety of data may be used, such as data in the JSON format, the CSV format, etc. A specific example of the data to be searched will be described later with reference to FIG. 8.

The sub-query executing unit 111 executes each of the plurality of kinds of sub-queries extracted by the sub-query extracting unit 110 in relation to the data to be searched stored in the data-to-be-searched DB 300.

For each of the plurality of kinds of sub-queries extracted by the sub-query extracting unit 110, the PL-data generating unit 112 generates, as association data (PL data), data in which the result of execution by the sub-query executing unit 111 is associated with information that allows identification of the kind of sub-query associated with the result of execution. This association data will hereinafter be referred to as "pre-linked data" or abbreviated as "PL data" as appropriate.

A PL-data management unit 120 stores and manages the thus-generated PL data for each of the plurality of kinds of sub-queries in the PL-data DB 400.

That is, the PL-data DB 400 stores the PL data for each of the plurality of kinds of sub-queries. The PL data for a certain kind of sub-query is data in which information that allows identification of the certain kind of sub-query is associated with the result of execution of the certain kind of sub-query.

As the information that allows identification of the certain kind of sub-query, any information that allows identification of the certain kind of sub-query suffices, as the name suggests, and the form, etc. thereof are not particularly limited. For example, in this embodiment, a condition that serves as a key for identifying the certain kind of sub-query (specifically, for example, "atk=10" in the case of a sub-query with which searching is performed on the basis of an attacking power) is associated with the result of execution of the certain kind of sub-query, constituting the PL data for the certain kind of sub-query.

Next, the functional configuration at the time of the search processing will be described.

In the search processing, the user-interface control unit 100, the query-condition sending control unit 101, the search-result obtaining unit 102, and the search-result display control unit 103 function in the player terminal 1, and the search processing unit 152 functions in the server 2.

The search processing unit 152 includes a PL-data management unit 120, a query-condition obtaining unit 121, a dividing unit 122, an execution-result extracting unit 123, a search-result generating unit 124, and a search-result sending control unit 125.

During game play, etc., the user-interface control unit 100 of the CPU 21 of the player terminal 1 executes control to display a screen for a predetermined user interface (see FIG. 7, which will be described later) on the display unit 27.

Furthermore, the user-interface control unit 100 accepts what is instructed by a touch operation performed by the player on the screen described earlier (the touch-operation input unit 26). For example, a query-condition accepting unit 131 of the user-interface control unit 100 accepts, as a query condition, a search condition entered by the player via touch operations on the touch-operation input unit 26.

The query-condition sending control unit 101 executes control to send the query condition accepted by the query-condition accepting unit 131 to the server 2 via the communication unit 30.

The query-condition obtaining unit 121 of the server 2 obtains, via the communication unit 59, the query condition that has been sent from the player terminal 1 as described above.

The dividing unit 122 divides the query condition obtained by the query-condition obtaining unit 121 into a set of one or more kinds of sub-queries. This set has the form of a logical expression in which the one or more kinds of sub-queries belonging thereto are joined together, for example, by using OR, AND, and NOT.

The execution-result extracting unit 123 extracts the individual results of execution of the one or more kinds of sub-queries resulting from the division by the dividing unit 122 from the PL-data management unit 120.

The search-result generating unit 124 generates a search result on the basis of the set of the results of execution of the one or more kinds of sub-queries, extracted by the execution-result extracting unit 123. Here, this set has the form of a logical expression in which the results of execution of the one or more kinds of sub-queries, belonging thereto, are joined together, for example, by using OR, AND, and NOT. Thus, the search-result generating unit 124 generates a search result by solving (calculating) the logical expression.

Here, an operation-order determining unit 141 is provided in an area of the search-result generating unit 124.

The operation-order determining unit 141 can estimate the costs of set operations for integrating the sub-queries (set operations for the logical expression) when the search-result generating unit 124 generates a search result.

The operation-order determining unit 141 proposes the most efficient order for applying the set operations by sorting the sub-queries in descending order of the ability to narrow down possible results according to the results of estimation.

The search-result sending control unit 125 executes control to send, via the communication unit 59, the search result generated by the search-result generating unit 124 to the player terminal 1.

The search-result obtaining unit 102 of the player terminal 1 obtains, via the communication unit 30, the search result that has been sent from the server 2 as described above.

The search-result display control unit 103 executes control to display the search result (more precisely, an image or the like representing the search result) obtained by the search-result obtaining unit 102 on the display unit 27.

Next, the flow of the data introduction processing executed by the server 2 having the functional configuration described above will be described with reference to FIG. 5.

Figure 5:
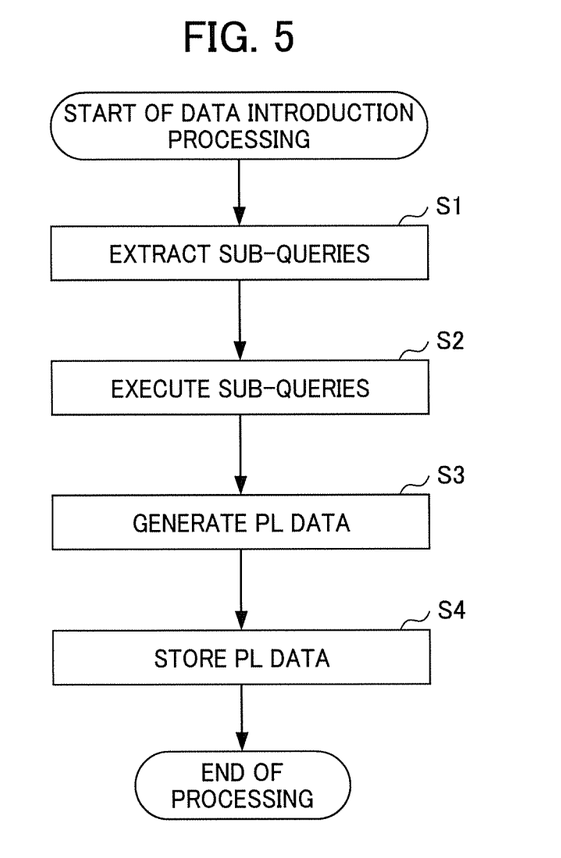
FIG. 5 is a flowchart of information processing executed by the server in FIG. 4.

FIG. 5 is a flowchart for explaining an example of the flow of the data introduction processing executed by the server 2 having the functional configuration shown in FIG. 4.

In step S1, the sub-query extracting unit 110 of the server 2 in FIG. 4 extracts a plurality of sub-queries on the basis of query conditions that may be used in the game in which data is to be introduced.

In step S2, the sub-query executing unit 111 executes each of the plurality of sub-queries extracted in the processing of step S1.

In step S3, for each of the plurality of sub-queries extracted in step S1, the PL-data generating unit 112 generates, as PL data, data in which the result of execution of a certain kind of sub-query in step S2 is associated with information that allows identification of the certain kind of sub-query.

In step S4, the PL-data management unit 120 stores the PL data generated in step S3 in the PL-data DB 400.

Then, the data introduction processing is terminated, and the PL data stored in the PL-data DB 400 for each of the plurality of sub-queries is subsequently managed by the PL-data management unit 120.

Next, the flow of the search processing executed by the player terminal 1 and the server 2 having the functional configurations described above will be described with reference to FIG. 6.

Figure 6:
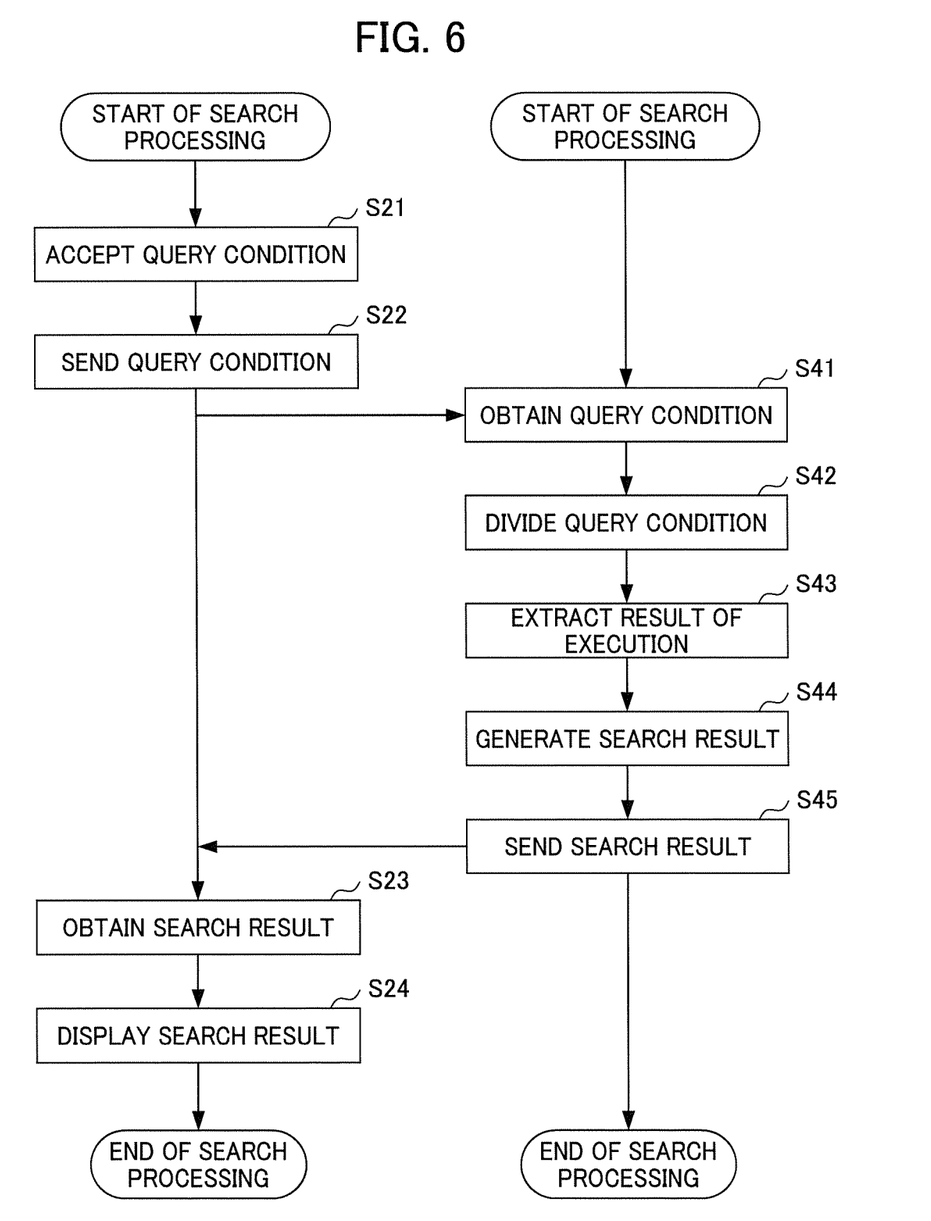
FIG. 6 is a flowchart of information processing executed by the player terminal and the server in FIG. 4.

FIG. 6 is a flowchart for explaining an example of the flow of the search processing executed by the player terminal 1 and the server 2 having the functional configurations shown in FIG. 4.

Here, it is assumed that, in executing the search processing in FIG. 6, the player enters desired search conditions (e.g., a condition designating cards with an attacking power greater than or equal to 15) by using a predetermined user interface (a specific example thereof will be described later with reference to FIG. 7) under the control of the user-interface control unit 100 of the player terminal 1.

When such an input is given, the processing proceeds to step S21.

In step S21, the query-condition accepting unit 131 of the player terminal 1 accepts, as a query condition, a search condition entered by the player.

In step S22, the query-condition sending control unit 101 sends, via the communication unit 30, the query condition accepted in step S21 to the server 2.

In step S41, the query-condition obtaining unit 121 of the server 2 obtains, via the communication unit 59, the query condition that has been sent from the player terminal 1.

In step S42, the dividing unit 122 divides the query condition obtained in step S41 into a plurality of kinds of sub-queries.

In step S43, the execution-result extracting unit 123 extracts the results of execution of the sub-queries resulting from the division in step S42 from the PL-data DB 400 via the PL-data management unit 120.

In step S44, the search-result generating unit 124 generates a search result on the basis of the results of execution extracted in step S43.

In the processing of step S44, the operation-order determining unit 141 in the search-result generating unit 124 estimates the searching costs of the sub-queries. Through optimization by such execution-order control, the search processing in step S44 is far more efficient compared with processing based on existing methods. The details of the processing by the operation-order determining unit 141 will be described later in the context of a specific example in FIG. 10.

In step S45, the search-result sending control unit 125 sends, via the communication unit 59, the search result generated in step S44 to the player terminal 1.

In step S23, the search-result obtaining unit 102 of the player terminal 1 obtains, via the communication unit 30, the search result that has been sent from the server 2 in step S45.

In step S24, the search-result display control unit 103 displays the search result obtained in step S23 on the display unit 27.

Next, specific examples relating to the data introduction processing or the search processing will be described with reference to FIG. 7 and the subsequent figures.

Figure 7:
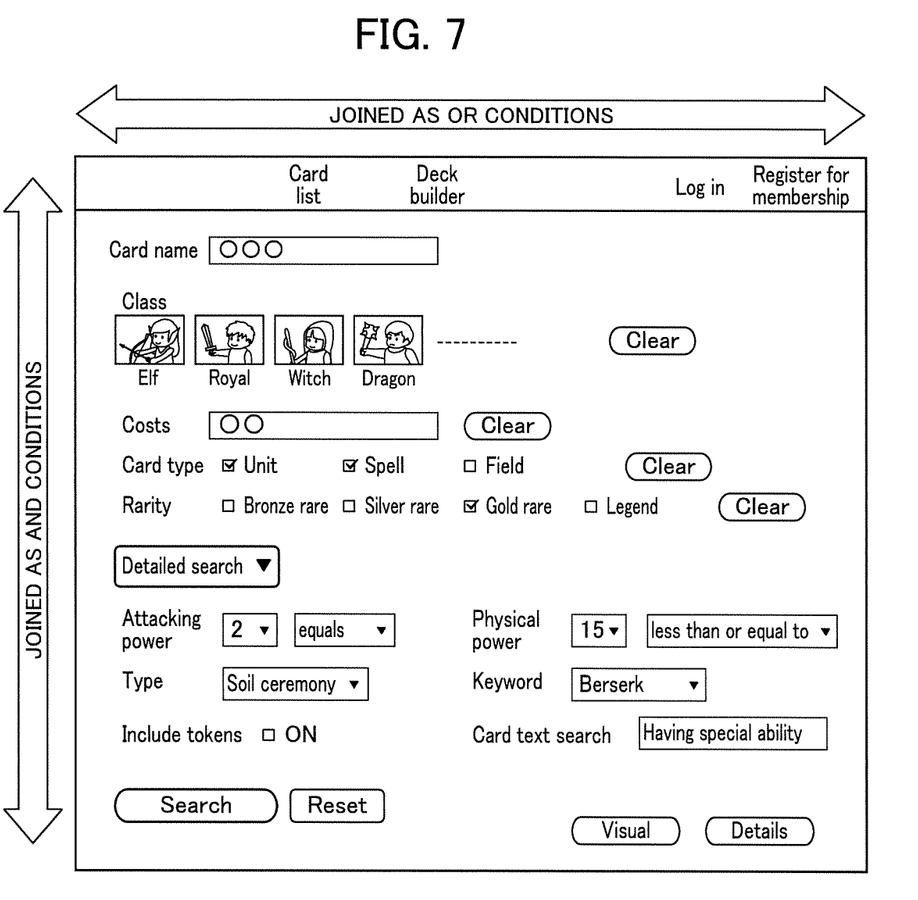
FIG. 7 is an illustration showing an example of a user interface screen displayed on the player terminal in FIG. 4.

FIG. 7 is an illustration showing an example of a searching screen constituting a user interface.

With a searching function in the game in this embodiment, which serves to realize the search processing, predefined searching parameters are selected by using pull-down menus or the like, and searching is performed with a query formed by joining the parameters together by using AND conditions or OR conditions.

In the case of the example in FIG. 7, the search parameters include "Class", "Costs", "Card type", "Rarity", "Attacking power", "Physical power", "Type", "Ability keyword", "Include tokens", and "Card text search", in that order from the top. Like this, each single searching parameter indicates a certain single kind of attribute.

For a single attribute, a plurality of kinds of sub-queries exist. In the example in FIG. 7, various kinds of sub-queries involving the same attribute are displayed as arrayed in the horizontal direction.

"Class" indicates the classes of cards to be searched. In the example in FIG. 7, three classes, namely, "Royal", "Dragon", and "Bishop" are selected as sub-queries.

"Costs" indicate the costs of cards to be searched, and it is possible to enter, as a sub-query, any numerical value that exists as a card in the game.

"Card type" signifies the types of cards to be searched, such as "Unit", "Spell", and "Field". In the example in FIG. 7, two sub-queries, namely, "Unit" and "Spell", are selected.

"Rarity" indicates the rarities of cards to be searched, such as "Bronze rare", "Silver rare", "Gold rare", and "Legend". In the example in FIG. 7, "Legend" is selected as a sub-query.

"Attacking power" is a parameter indicating the attacking powers of cards to be searched. In the example in FIG. 7, since an attacking power of "2" and a condition "equals" are selected, it is indicated that only cards having an attacking power of 2 are selected as sub-queries.

"Physical power" is a parameter indicating the physical powers of data to be searched. In the example in FIG. 7, since a physical power of "15" and a condition "less than or equal to" are selected, it is indicated that the individual values less than or equal to the physical power of 15 (1, 2, 3, 4, 5, 6, 7, 8, 9, 10, 11, 12, 13, 14, 15) are selected as sub-queries.

That is, since it is possible with static data to examine all ranges of data values in advance, for example, in the case where a search condition is set as a range "attacking power less than or equal to 3", it is possible to define the value ranges as OR conditions. Specifically, in the case of "attacking power less than or equal to 3", it is possible to define the search condition as "3 or 2 or 1". That is, it is possible to express the search condition "attacking power less than or equal to 3" as a set of OR conditions of sub-queries "3", "2", and "1".

"Include tokens" indicates whether or not "token" cards are to be included. In the example in FIG. 7, since "ON" is not selected, "tokens" are not included in the data to be searched.

"Card text search" indicates searching based on "keywords" included in card text, and some "keywords" are set in advance so that they can be selected. In the example in FIG. 7, since "having special ability" is selected, the keyword "having special ability" serves as a sub-query, and thus only cards including the sub-query (keyword) are to be searched.

Regarding keywords, for example, if the n-gram method is used, both data to be searched and search conditions can be modelized as sets of combinations of n characters. More specifically, in the case where a keyword "samurai" is represented with 2-grams, which are a kind of n-grams, it is possible to divide the keyword into three elements, namely, "samu", "mura", and "rai"; that is, it is possible to define searching with the keyword "samurai" as a logical product of three query conditions "samu AND mura AND rai". That is, even in searching in which the flexibility of query expressions seems to be high, such as keyword searching, it is possible to represent a search condition as a combination of a finite number of primitive sub-queries.

As described above, in the search processing in the information processing system according to this embodiment, such a search condition entered by the player is divided into sub-queries constituting highly reusable minimum units, and the individual results of searching executed in advance (the results of advance execution of sub-queries) are used, which realizes search processing at an extremely high speed.

That is, as described above, the point of the search processing according to this embodiment is that the data introduction processing according to the present invention is executed prior to the search processing. Thus, details of the data introduction processing according to the present invention will be described below.

In the static analysis in the data introduction processing according to this embodiment, it is necessary to receive, as inputs, a set of data to be searched (the data-to-be-searched DB 300 in FIG. 4) and a set of minimum-unit sub-queries constituting queries (the set-of-queries DB 200 in FIG. 4), and as a result, it is necessary that the results of execution of all the sub-queries (search results) can be identified on the basis of individually unique identifiers.

This identification makes it possible, in the search processing phase, to generate a search result just by executing processing for integrating the execution results of different sub-queries without having to execute the sub-queries (execute searching).

Specifically, for example, data to be searched Di can be constituted of pairs of unique identifiers and attributes to be searched, as expressed in equation (2) below:

$$D_i := \{Id_i, attr1, attr2, attr3, \ldots, attrI\} \quad (2)$$

Here, Idi signifies an identifier that allows unique identification of the data to be searched Di. For example, it is possible to implement identifiers by using serial numbers; however, this embodiment does not depend on any specific method of assigning identifiers.

Furthermore, attr1 to attrI signify I (I is an arbitrary integer) attribute data associated with the data to be searched Di.

Figure 8:
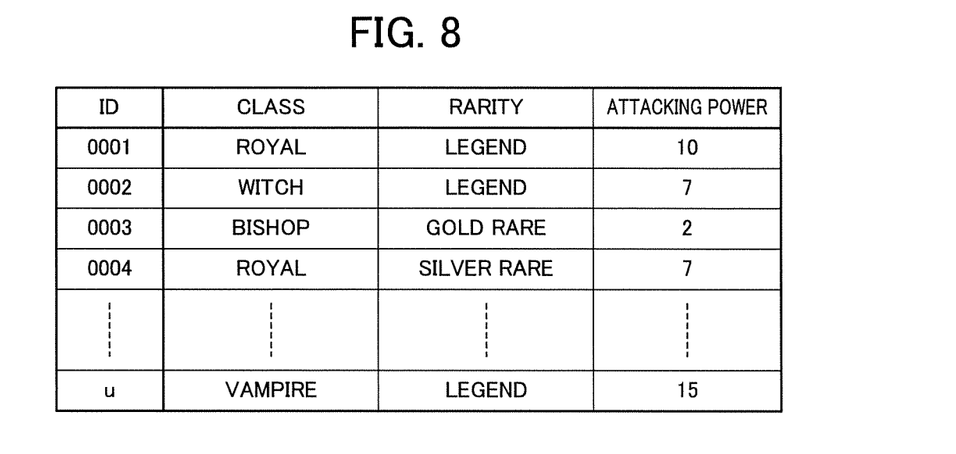
FIG. 8 is a diagram showing an example of data to be searched stored in a data-to-be-searched DB in FIG. 4.

For example, FIG. 8 is a diagram showing a specific example of data to be searched.

In the example in FIG. 8, each row corresponds to specific data in the game (data to be searched), having a specific identifier.

As an example, in FIG. 8, the data on the first row is data matching the conditions including the class "Royal", the rarity "Legend", and the attacking power "10" and having an ID "0001".

As another example, the data on the second row is data matching the conditions including the class "Witch", the rarity "Legend", and the attacking power "7" and having an ID "0002".

Here, in the example in FIG. 8, "Class", "Rarity", and "Attacking power" are the attributes to be searched, and obviously, these attributes can be changed or added freely.

There are u (u is an arbitrary integer greater than or equal to 1) pieces of these data in the game, and it is possible to cover the entire data to be searched in the game.

In the data introduction processing in this embodiment, with the data to be searched in the game, having the above-described structure shown in FIG. 8, each of the plurality of kinds of sub-queries extracted from the set of queries is executed (searching is executed). Then, for each of the plurality of kinds of sub-queries, PL data in which the result of execution of the sub-query is associated with information that allows identification of the sub-query is generated and is stored in the PL-data DB 400.

Figure 9:
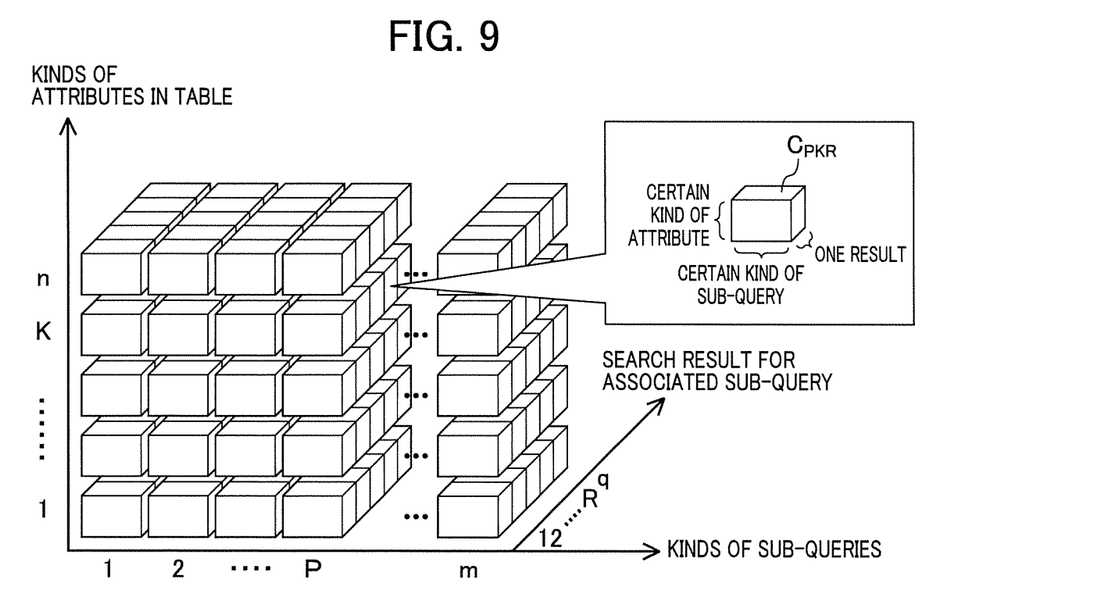
FIG. 9 is a chart showing an example of the structure of a PL-data DB in FIG. 4.

FIG. 9 is a chart showing an example of the structure of the above-described PL-data DB 400.

In the example in FIG. 9, the y axis represents the kinds of attributes in the table, the x axis represents the kinds of sub-queries, and the z axis represents the search result (a single result) for the associated sub-query.

The kinds of attributes in the table represent the kinds of arbitrary attributes. The kinds of attributes in the table correspond to the searching parameters arrayed in the vertical direction in the case of the example in FIG. 7 and correspond to "Class", "Rarity", "Attacking power", etc. in the example in FIG. 8. In the example in FIG. 9, n (n is an arbitrary integer greater than or equal to 1) kinds of attributes in the table exist.

The kinds of sub-queries correspond to conditions arrayed in the horizontal direction in the case of the example in FIG. 7 and represent the kinds of arbitrary sub-queries. In the case of the example in FIG. 8, the kinds of sub-queries correspond to possible values of the attribute "Attacking power", specifically, for example, "10" on the first row. In the case of the example in FIG. 9, m (m is an arbitrary integer greater than or equal to 1) kinds of sub-queries exist.

The search result for the associated sub-query indicates the result of execution of a sub-query (search result) associated with a certain kind of sub-query (e.g., "10") for a certain kind of attribute in the table (e.g., "Attacking power").

In the case of the example in FIG. 9, the search result for the associated sub-query is an array including q (q is an arbitrary integer greater than or equal to 1) elements starting from 0, and the sizes of individual arrays vary among sub-queries.

For example, the result of execution of the sub-query for the kind of sub-query "P" in the kind of attribute in the table "K" is represented by one or more cubes arrayed along the Z axis (the direction of the axis of the search result for the associated sub-query) at the coordinates (X, Y)=(P, K). Here, a cube CPKR shown in FIG. 9 corresponds to a single result (a single element in the set of search results) for a query with a specific kind of sub-query "Y" for a specific kind of attribute "K".

When the PL-data DB 400 having the structure described above and shown in FIG. 9 has been prepared, it becomes possible to execute the search processing described above.

As described above, in the search processing in this embodiment, a search result is generated by calculating a logical operation in which one or more kinds of sub-queries obtained by dividing a searching query condition are joined together.

In this embodiment, the operation-order determining unit 141 (FIG. 4) determines an optimal order for calculating the logical expression, which enables high-speed searching. Thus, specific processing executed by the operation-order determining unit 141 will be described below with reference to FIG. 10.

Figure 10:
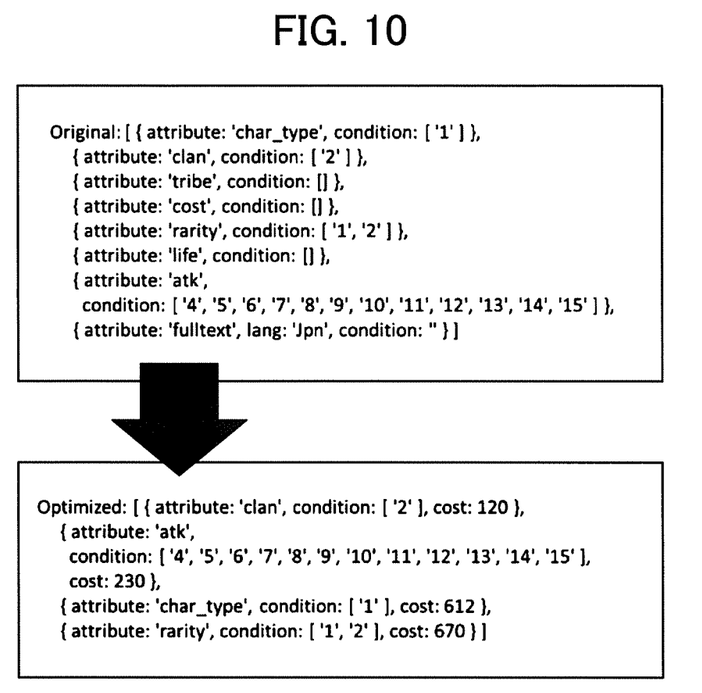
FIG. 10 is a diagram showing processing for estimating searching costs and processing for optimizing an execution order, executed in an operation-order determining unit in FIG. 4.

FIG. 10 is a diagram showing an example of the processing for estimating searching costs and the processing for optimizing the execution order, executed by the operation-order determining unit 141 provided in the search-result generating unit 124 of the server 2.

The operation-order determining unit 141 can estimate the costs of set operations for integrating the results of execution of sub-queries extracted by the execution-result extracting unit 123 (calculating set operations based on logical expressions) by referring to the numbers of elements in the sets representing the results of execution of the sub-queries.

By estimating the operation costs in this manner, the operation-order determining unit 141 can optimize the order of operations so that set operations can be executed just with a small number of comparison operations even if the query condition is complex.

In the example in FIG. 10, first, as a query in an initial state, a query is created as an array of pairs of attributes to be searched and sequences (conditions) of values thereof (sub-queries). The individual values are joined together as OR conditions.

For example, in the case of the first row in the upper figure, the attribute to be searched is "char_type", and the sequence of values thereof (sub-queries) is "1".

Here, this query itself is just a concatenation of conditions entered via the user interface under the control of the user-interface control unit 100, and thus efficiency, etc. is not taken into consideration.

Thus, as shown in FIG. 10, the operation-order determining unit 141 reorders the array of sub-queries so that sub-queries will be executed in order from the sub-query having the lowest selection ratio, in other words, the narrowing-down condition that involves the severest restriction and thus minimizes the number of hit data.

More specifically, the operation-order determining unit 141 refers to the numbers of elements (the numbers of results of execution of sub-queries) in the sets of search results associated with sub-queries in the PL-data DB 400, and sorts the sub-queries in descending order of the numbers of elements in the sets to obtain the most efficient order for applying set operations.

The attribute "cost" added in the lower figure in FIG. 10 indicates the number of results returned for the relevant condition (the number of elements in the set of search results associated with the sub-query in the PL-data DB 400), and the operation-order determining unit proposes the most efficient order for applying set operations on the basis of the values of "cost".

Although embodiments of the present invention have been described above, it is to be noted that the present invention is not limited to the above-described embodiments and that modifications, improvements, etc. are encompassed in the present invention.

For example, the functional configuration in FIG. 4 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 4. Furthermore, the locations of the functional blocks are not particularly limited to those in FIG. 4 and may be arbitrarily set. For example, the functional blocks of the server 2 may be transferred to the player terminal 1, etc. Conversely, the functional blocks of the player terminal 1 may be transferred to the server 2, etc.

Furthermore, each functional block may be implemented by hardware alone, by software alone, or by a combination of hardware and software.

In a case where the processing by each functional block is executed by software, a program constituting the software is installed on a computer, etc. via a network or from a recording medium.

The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

Furthermore, for example, although static data that is used mainly in an online game or the like is adopted as the data to be searched in the embodiment described above, there is no particular limitation to this type of data.

The static analysis technology according to this invention can also be used in offline car navigation systems, offline content such as offline electronic dictionaries, full-text search engines directed to sets of fixed text on the Web, etc.

Furthermore, the applications of the static analysis technology according to the present invention are not limited to simple character-string searching or numerical searching. Specifically, since the present invention does not depend on any specific searching means, such as character-string searching, for example, static resolution is possible even if an extremely complex condition, such as image searching, is introduced.

Accordingly, it is possible to handle any search condition that can statically define a kind of query, even if the search condition is extremely complex.

More specifically, as long as it is possible to express query conditions so as to satisfy three conditions among individual conditions constituting a query, namely, reductiveness, idempotence, and commutativity, it is possible to adopt the query conditions as data to be searched.

Here, reductiveness refers to the property that the search result always becomes smaller than the data to be searched.

Idempotence refers to the property that the same sub-query executed with the same data always yields the same result no matter how many times it is executed. That is, the result may be cached. That is, a condition such as "search by using the current time" is not involved.

Commutativity refers to the property that the result of searching with condition A and condition B always becomes the same as the result of searching with condition B and condition A. In the present invention, on the basis of this commutativity, the order of comparisons for set operations involved in sub-queries is rearranged, so that a search result can be obtained with a minimum number of comparisons.

In other words, an information processing system according to the present invention may be embodied in various forms configured as follows, including the information processing system according to the above-described embodiment in FIGS. 1 and 4.

Specifically, the information processing systems according to the present invention is:

an information processing system that executes processing for searching data to be searched by using a query condition that can be entered via a predetermined user interface and in which individual conditions constituting a query satisfy three properties consisting of reductiveness, idempotence, and commutativity, the information processing system including:

a pre-processing executing means (e.g., the data-introduction processing unit 151 in FIG. 4) for executing processing prior to processing for searching; and a search processing means (e.g., the search processing unit 152 in FIG. 4) for executing processing for searching,
wherein the pre-processing executing means includes:
a query extracting means (e.g., the sub-query extracting unit 110 in FIG. 4) for extracting a plurality of kinds of sub-queries from a set of query conditions that may be used with the data to be searched;
a query executing means (e.g., the sub-query executing unit 111 in FIG. 4) for executing each of the plurality of kinds of sub-queries extracted by the query extracting means;
an associating means (e.g., the PL-data generating unit 112 in FIG. 4) for generating, as association data for each of the plurality of kinds of sub-queries extracted by the query extracting means, data in which a result of execution by the query executing means is associated with information that allows identification of the kind of sub-query associated with the result of execution; and
a management means (the PL-data management unit 120 in FIG. 4) for managing the association data for each of the plurality of kinds of sub-queries, generated by the associating means, and
wherein the search processing means includes:
an accepting means (e.g., the user-interface control unit 100 in FIG. 4) for accepting, as a searching query condition, a query condition entered for searching via the user interface;
a dividing means (e.g., the dividing unit 122 in FIG. 4) for dividing the searching query condition accepted by the accepting means into a set of one or more kinds of sub-queries;
an execution-result extracting means (e.g., the execution-result extracting unit 123 in FIG. 4) for extracting, from the association data, the result of execution of each of the one or more kinds of sub-queries resulting from the division by the dividing means and belonging to the set on the basis of the information that allows identification of each of the one or more kinds of sub-queries; and
a search-result generating means (e.g., the search-result generating unit 124 in FIG. 4) for generating, on the basis of the result of extraction by the execution-result extracting means, a search result for the searching query condition accepted by the accepting means.

Furthermore, the search-result generating means may generate a search result for the searching query condition accepted by the accepting means by performing logical operations with the individual results of execution of the one or more kinds of sub-queries extracted by the execution-result extracting means according to a certain order determined for the individual results of execution of the one or more kinds of sub-queries, and the search-result generating means may further include a processing-order determining means (e.g., the operation-order determining unit 141 in FIG. 4) for calculating searching costs for the individual results of execution of the one or more sub-queries extracted by the execution-result extracting means in accordance with the amounts of the results of execution of the sub-queries in the data to be searched and for determining the certain order of the logical operations in the search-result generating means on the basis of the searching costs.

With the estimation of searching costs for sub-queries and the optimization by controlling the order of execution, the present invention makes it possible to execute search processing far more efficiently compared with existing methods.

Furthermore, the predetermined user interface may have an operation function for allowing selection of a certain one kind from the plurality of kinds of sub-queries for each of a plurality of kinds of attributes.

This serves to increase the variety of searching that can be performed by a player and also makes it possible to readily deal with cases where, for example, data to be searched is added.

Furthermore, the result of execution of a certain kind of sub-query involving a certain kind of attribute by the query executing means may include the certain kind of attribute, the certain kind of sub-query, and the amount of the result of execution of the certain kind of sub-query involving the certain kind of attribute in the data to be searched.

This makes it possible to arbitrarily determine a certain kind of sub-query and a certain kind of attribute, which makes it possible to handle static data more efficiently and at higher speed.

EXPLANATION OF REFERENCE NUMERALS

1, 1-1 to 1-$m$ Player terminal
2 Server
21, 51 CPU
100 User-interface control unit
101 Query-condition sending control unit
102 Search-result obtaining unit
103 Search-result display control unit
110 Sub-query extracting unit
111 Sub-query executing unit
112 PL-data generating unit
120 PL-data management unit
121 Query-condition obtaining unit
122 Dividing unit
123 Execution-result extracting unit
124 Search-result generating unit
125 Search-result sending control unit
200 Set-of-queries DB
300 Data-to-be-searched DB
400 PL-data DB

The invention claimed is:
1. An information processing system that executes processing using a query condition in which individual conditions constituting a query satisfy three properties consisting of reductiveness, idempotence, and commutativity, the information processing system comprising:
   a predetermined user interface that obtains the query condition during execution of an online game;
   a database that stores static data in association with a plurality of kinds of sub-queries, wherein the static data is searching data that is searched in response to the query condition and corresponds to one or more game scenario proceedings of the online game;
   a data-introduction processer that executes processing prior to processing for searching; and
   a search processor for executing processing for searching,
   wherein the data-introduction processer performs:
      extracting the plurality of kinds of sub-queries constituting minimum units of queries and satisfying the three properties consisting of the reductiveness, the idempotence, and the commutativity by analyzing a set of statically defined kinds of queries;
      executing the plurality of kinds of sub-queries;
      generating, for each of the plurality of kinds of sub-queries, association data in which a result of execution is associated with an identifier that allows identification of a kind of sub-query associated with the result of execution, the association data corresponding to the static data in the database; and
      managing the association data for the plurality of kinds of sub-queries, and
   wherein the search processor performs:
      accepting, during the online game and as a searching query condition, the query condition entered for searching via the predetermined user interface;
      dividing the query condition into a set of sub-queries, the set of sub-queries being connected by a logical expression;
      extracting, from the association data, a result of execution of the set of sub-queries resulting from the division based on the identifier; and
      generating, based on a result of the extraction, a search result for the query condition, wherein the search result is presented in the online game.

2. An information processing system according to claim 1,
   wherein the search processor generates a search result for the query condition by performing logical operations with individual results of execution of the set of sub-queries according to a certain order determined for the individual results of execution of the set of sub-queries, and
   wherein the search processor further calculates searching costs for the individual results of execution of the set of sub-queries in accordance with the amounts of the results of execution of the set of sub-queries in the data to be searched and for determining the certain order of the logical operations based on the searching costs.

3. An information processing system according to claim 1,
   wherein the predetermined user interface has an operation function for allowing selection of a certain one kind from the plurality of sub-queries for each of a plurality of kinds of attributes.

4. An information processing system according to claim 3, wherein a result of execution of a certain kind of sub-query involving a certain kind of attribute by the data-introduction processer includes the certain kind of attribute, the certain kind of sub-query, and the amount of the result of execution of the certain kind of sub-query involving the certain kind of attribute in the data to be searched.

5. An information processing method executed by an information processing system that executes processing using a query condition in which individual conditions constituting a query satisfy three properties consisting of reductiveness, idempotence, and commutativity, the information processing method comprising:
  executing pre-processing prior to processing for searching; and
  executing search processing for searching,
  wherein the pre-processing includes:
    extracting a plurality of kinds of sub-queries constituting minimum units of queries and satisfying the three properties consisting of the reductiveness, the idempotence, and the commutativity by analyzing a set of statically defined kinds of queries;
    executing the plurality of kinds of sub-queries;
    generating, for each of the plurality of kinds of sub-queries, association data in which a result of execution is associated with an identifier that allows identification of a kind of sub-query associated with the result of execution, the association data corresponding to static data in a database, wherein the static data is searching data that is searched in response to the query condition and corresponds to one or more game scenario proceedings of an online game; and
    managing the association data for the plurality of kinds of sub-queries and
  wherein the search processing includes:
    accepting, during the online game and as a searching query condition, the query condition entered for searching via a predetermined user interface, wherein the predetermined user interface obtains the query condition during execution of the online game;
    dividing the query condition into a set of sub-queries;
    extracting, from the association data, a result of execution of the set of sub-queries resulting from the division based on the identifier; and
    generating, based on a result of the extraction, a search result for the query condition, wherein the search result is presented in the online game.

6. A non-transitory computer readable medium storing a program for a server and a client included in an information processing system that executes processing using a query condition in which individual conditions constituting a query satisfy three properties consisting of reductiveness, idempotence, and commutativity, the program comprising functionality for:
  allowing the server to execute control processing including executing pre-processing prior to processing for searching; and
  allowing the server or the client to execute control processing including a executing search processing for searching,
  wherein the pre-processing includes:
    extracting a plurality of kinds of sub-queries constituting minimum units of queries and satisfying the three properties consisting of the reductiveness, the idempotence, and the commutativity by analyzing a set of statically defined kinds of queries;
    executing the plurality of kinds of sub-queries;
    generating, for each of the plurality of kinds of sub-queries, association data in which a result of execution is associated with an identifier that allows identification of a kind of sub-query associated with the result of execution, the association data corresponding to static data in a database, wherein the static data is searching data that is searched in response to the query condition and corresponds to one or more game scenario proceedings of an online game; and
    managing the association data for each of the plurality of kinds of sub-queries, and
  wherein the search processing includes:
    accepting, during the online game and as a searching query condition, the query condition entered for searching via a predetermined user interface, wherein the predetermined user interface obtains the query condition during execution of the online game;
    dividing the query condition into a set of sub-queries;
    extracting, from the association data, a result of execution of the set of sub-queries resulting from the division based on the identifier; and
    generating, based on a result of the extraction, a search result for the query condition, wherein the search result is presented in the online game.

7. An information processing system according to claim 1, wherein the query condition is input via a touch sensing operation, and the set of subqueries relate to at least one attribute in the online game.

* * * * *